(12) United States Patent
Yadav et al.

(10) Patent No.: US 8,843,711 B1
(45) Date of Patent: Sep. 23, 2014

(54) PARTIAL WRITE WITHOUT READ-MODIFY

(75) Inventors: Sandeep Yadav, Santa Clara, CA (US);
Blake Lewis, Sunnyvale, CA (US);
Subramaniam Periyagaram,
Sunnyvale, CA (US)

(73) Assignee: NetApp, Inc., Sunnyvale, CA (US)

(*) Notice: Subject to any disclaimer, the term of this patent is extended or adjusted under 35 U.S.C. 154(b) by 275 days.

(21) Appl. No.: 13/338,333

(22) Filed: Dec. 28, 2011

(51) Int. Cl.
| G06F 12/00 | (2006.01) |
| G06F 13/00 | (2006.01) |
| G06F 13/28 | (2006.01) |
| G06F 9/26 | (2006.01) |
| G06F 9/34 | (2006.01) |
| G06F 3/06 | (2006.01) |

(52) U.S. Cl.
CPC .............. G06F 3/0608 (2013.01); G06F 3/064 (2013.01)
USPC ........................... 711/154; 711/165; 711/201

(58) Field of Classification Search
CPC ... G06F 3/0689; G06F 3/0605; G06F 3/0607; G06F 3/064; G06F 3/0644; G06F 12/0292; G06F 12/1027; G06F 12/04; G06F 12/0246; G06F 12/0284; G06F 2211/1066; G06F 2211/1044
USPC ......................... 711/154, 165, 201
See application file for complete search history.

(56) References Cited

U.S. PATENT DOCUMENTS

| 6,192,432 | B1* | 2/2001 | Slivka et al. ............... 710/68 |
| 6,289,428 | B1* | 9/2001 | Derrick et al. .............. 711/201 |
| 6,571,362 | B1* | 5/2003 | Crater et al. ................ 714/701 |
| 6,587,915 | B1* | 7/2003 | Kim ............................ 711/103 |
| 7,296,135 | B2* | 11/2007 | Thompson ................... 711/201 |
| 7,594,062 | B2* | 9/2009 | In et al. ....................... 711/103 |
| 2002/0099904 | A1* | 7/2002 | Conley ....................... 711/103 |
| 2010/0161567 | A1* | 6/2010 | Makela ....................... 707/693 |
| 2012/0110243 | A1* | 5/2012 | Yeh ............................. 711/103 |

\* cited by examiner

*Primary Examiner* — Matthew Bradley
*Assistant Examiner* — Rocio Del Mar Perez-Velez
(74) *Attorney, Agent, or Firm* — Klein, O'Neill & Singh, LLP

(57) ABSTRACT

A method for efficiently handling partial write requests in a storage system includes allocating a new block of data for the new partial data, and allocating a record in an extent map to record the location of the new partial data block, the location of the old partial data block and the offset length for each data block. Data blocks can be repackaged in the background when system resources are available. A full, but misaligned write request is also efficiently handled by writing the new data to a newly allocated data block and allocating new records in an extent map to record information corresponding to two partial write operations.

21 Claims, 7 Drawing Sheets

PARTIAL WRITE WITHOUT READ-MODIFY

FIELD OF THE INVENTION

The present invention is directed generally toward data storage devices, and more particularly toward efficient handling of partial write operations.

BACKGROUND OF THE INVENTION

Various forms of data storage systems exist today. Network-based storage systems typically include at least one storage server, which is a processing system configured to store and retrieve data on behalf of one or more client processing systems (clients). The data is stored and retrieved as storage objects, such as blocks and/or files. A block is a sequence of bytes or bits of data having a predetermined length. A file is a collection of related bytes or bits having an arbitrary length. In the context of network-attached storage (NAS), a data storage system operates on behalf of one or more clients to store and manage file-level access to data. The files may be stored in a storage system that includes one or more arrays of mass storage devices, such as magnetic or optical disks or tapes, or solid state devices such as flash, by using a data storage scheme such as Redundant Array of Inexpensive Disks (RAID). In a SAN context, a storage server provides clients with block-level access to stored data, rather than file-level access. Some storage servers are capable of providing clients with both file-level access and block-level access, such as certain storage servers made by NetApp, Inc. (NetApp®) of Sunnyvale, Calif.

Write Anywhere File Layout (WAFL) data storage systems, including a WAFL aggregate, may include one or more flexible volumes, one or more volume containers, and physical storage. A WAFL aggregate is a physical storage container that can store data in the WAFL file system. A flexible volume is a logical volume that allows the virtualization of the allocation of volumes on physical storage. Thereby multiple, independently managed flexible volumes can share the same physical storage (e.g., physical storage). The virtualization requires mapping between virtual volume block numbers (VVBNs) used by flexible volume and physical volume block numbers (PVBNs) used by a WAFL aggregate to access data stored in physical storage. A PVBN, as used herein, refers to disk blocks that have been abstracted into a single linear sequence in the aggregate. Each volume container corresponds to a flexible volume. A volume container contains all the data blocks for a corresponding flexible volume.

As used herein, a block offset or an offset refers to a distance from the beginning of a storage object such as a volume, file, extent, etc. Block addresses used within a flexible volume refer to block offsets within a volume container. Since a volume container contains every block within a flexible volume, there are two ways to refer to the location of a particular block. The PVBN specifies the location of a block within a WAFL aggregate.

The VVBN specifies the offset of the block within the container file. When a block in a file is requested, a flexible volume translates the file offset into a VVBN. The VVBN is passed from a flexible volume to a volume container. A volume container translates the VVBN to a PVBN. The PVBN is then used to access the requested block in physical storage.

Additionally, when a PVBN is initially written, the block pointer for the PVBN in a flexible volume is written to include (e.g., in a cache) the PVBN for the VVBN. Thereby, when the requested block is required, the flexible volume can use the stored PVBN to access physical storage.

Current implementations of WAFL define a file as a component of a hierarchical organization of data such as a tree of indirect blocks. Each indirect block in the tree has a predetermined span size: a predetermined number of entries, each pointing to another block in the tree. Extents are represented using an entry for each block within the extent. An extent, as used herein, refers to a contiguous group of one or more blocks. As a result, the amount of indirect block metadata is linear with respect to the size of the file. Additionally, disk gardening techniques, such as segment cleaning, file reallocation, etc., are complicated by caching PVBN pointers in VVBN blocks.

Storage systems often use a predetermined block size for all internal operations. For example, WAFL uses 4 KB (e.g., 5096 bytes) blocks for both VVBN and PVBN, as do client-side file systems for file block numbers (FBN). Block boundaries are expected to occur every 4 KB from an initial offset (e.g., FBN 0). Since file systems usually offset individual files based on these block boundaries, application writers take advantage of a file system's block size and alignment to increase the performance of their input/output ("I/O") operations—for example, always performing operations that are a multiple of 4 KB, and always aligning these operations to the beginning of a file. Other file systems or applications, such as a virtual machine, may use a block boundary of a different size (e.g., a virtual machine environment in which an initial master boot record block of 612 bytes is followed by the expected 4 KB blocks), resulting in misalignment between FBNs and PVBNs. Additionally, multiple virtual machines may share a single volume container and each virtual machine may be misaligned by a different amount.

Consequently, it would be advantageous if a method and apparatus existed that are suitable for executing partial write operations and misaligned write operations as if they were full, properly aligned write operations for later correction when system resources are available. Such a method and apparatus would be particularly advantageous in a data storage system utilizing data compression.

SUMMARY OF THE INVENTION

Accordingly, the present invention is directed to a novel method and apparatus for executing partial write operations and misaligned write operations as if they were full, properly aligned write operations for later correction when system resources are available.

One embodiment of the present invention is a data storage system having a processor, memory and a data storage device. The processor writes new data to the data storage device in a newly allocated block and maintains a table associating the location in the data storage device of the newly allocated block with a location in the data storage device of data that would be overwritten by the data in the newly allocated block.

Another embodiment of the present invention is a method of executing write operations in a data storage system. When a write request is received, a new block of data is allocated in a data storage device and a new record is allocated in a table. The new data is written to the new block of data even if the new data is less than a full block size, and the location of the new block of data is stored in the new record along with the location of old data that would have been overwritten if the new data had not been written to a new block of data.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Reference will now be made in detail to the subject matter disclosed, which is illustrated in the accompanying drawings. The scope of the invention is limited only by the claims; numerous alternatives, modifications and equivalents are encompassed. For the purpose of clarity, technical material that is known in the technical fields related to the embodiments has not been described in detail to avoid unnecessarily obscuring the description.

Figure 1:
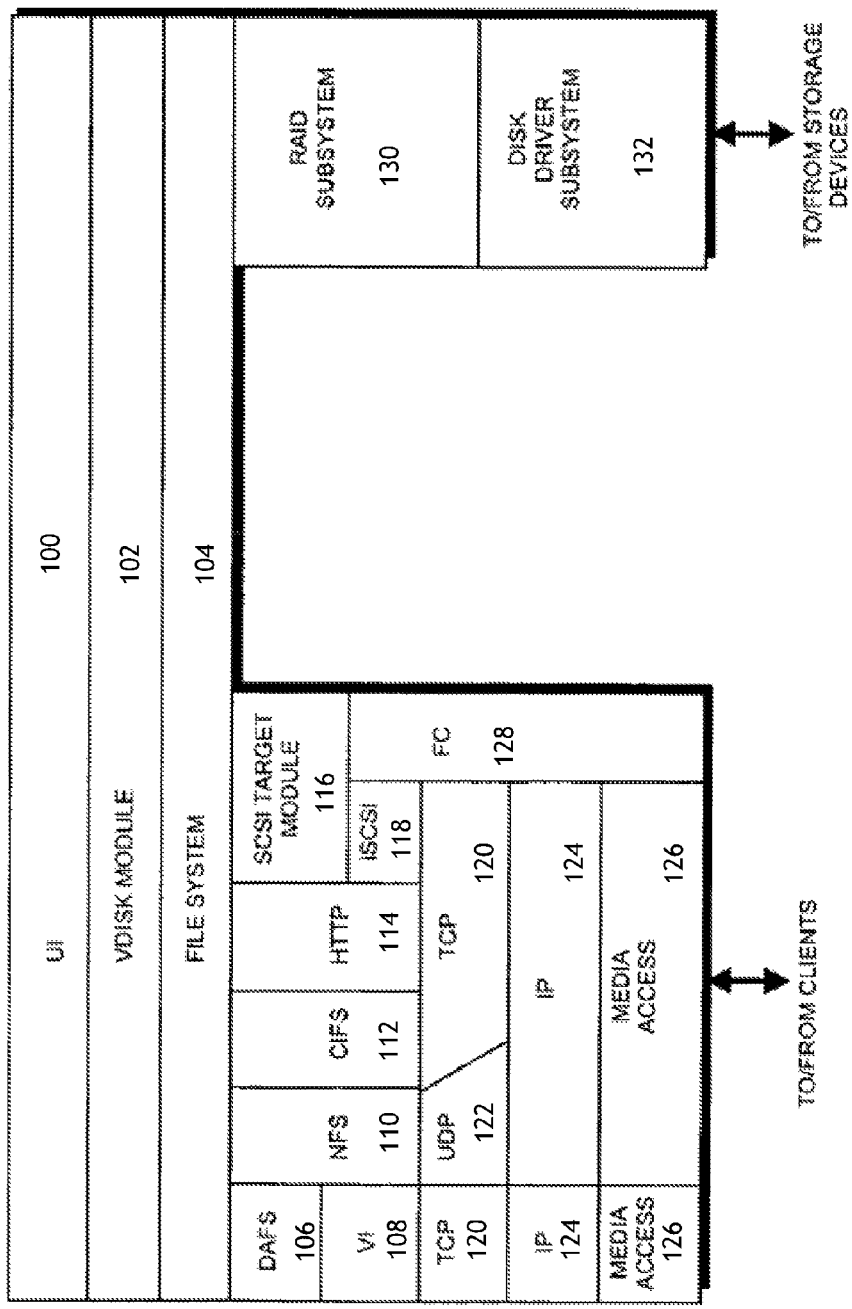
FIG. 1 shows a schematic block diagram of an exemplary storage operating system useful in implementing the present invention.

Referring to FIG. 1, a schematic block diagram of an exemplary storage operating system is shown. The storage operating system may comprise a series of software layers organized to form an integrated network protocol stack or, more generally, a multiprotocol engine that provides data paths for clients to access information stored on a data storage system using block and file access protocols. The protocol stack may include a media access layer 126 of network drivers (e.g., gigabit Ethernet drivers) that interfaces to network protocol layers, such as the IP layer 124 and its supporting transport mechanisms, the TCP layer 120 and the User Datagram Protocol (UDP) layer 122. A file system protocol layer may provide multiprotocol file access and, to that end, includes support for the DAFS protocol 106, the NFS protocol 110, the CIFS protocol 112 and the Hypertext Transfer Protocol (HTTP) protocol 114. A VI layer 108 may implement the VI architecture to provide direct access transport (DAT) capabilities, such as RDMA, as required by the DAFS protocol 106.

An iSCSI driver layer 118 may provide block-based protocol access over the TCP/IP network protocol layers, while a FC driver layer 128 receives and transmits block access requests and responses to and from clients. The FC 128 and iSCSI 118 drivers may provide FC-specific and iSCSI-specific access control to storage devices and other logical units. In addition, the storage operating system may include a RAID subsystem 130 that may implement a disk storage protocol, such as a RAID protocol, as well as a disk driver subsystem 132 for retrieving data blocks from storage devices in accordance with a disk access protocol such as, e.g., a SCSI protocol.

Bridging the disk software layers 130 and 132 with the integrated network protocol stack layers 106-128 may be a virtualization system that is implemented by a storage manager or file system 104 interacting with virtualization modules illustratively embodied as, e.g., virtual disk ("vdisk") module 102 and SCSI target module 116. The vdisk module 120 may be layered on the file system 104 to enable access by administrative interfaces, such as a user interface (UI) 100, in response to a user (system administrator) issuing commands to the data storage system. The SCSI target module 116 may be disposed between the FC 128 and iSCSI 118 drivers and the file system 104 to provide a translation layer of the virtualization system between the block space and the file-system space, where blocks are represented as virtual disks. The UI 100 may be disposed over the storage operating system in a manner that enables administrative or user access to various layers and subsystems, such as the RAID subsystem 130.

In at least one embodiment, the file system 104 may be a message-based system that provides volume management capabilities used to access information stored on one or more data storage devices. That is, in addition to providing file-system semantics, the file system 104 may provide functions normally associated with a volume manager. These functions may include (i) aggregation of the disks, (ii) aggregation of storage bandwidth of the disks, and (iii) reliability guarantees, such as mirroring and/or parity (RAID). The file system 104 may implement the Write Anywhere File Layout (WAFL) file system, which organizes its on-disk data using fixed-sized, e.g., 4 kilobyte (kB) blocks. The illustrative file system 104 may use index nodes ("inodes") to identify files and store file attributes (such as creation time, access permissions, size, and block location). Embodiments of the present invention may be implemented as part of a file system 104 in a storage operating system.

Figure 2:
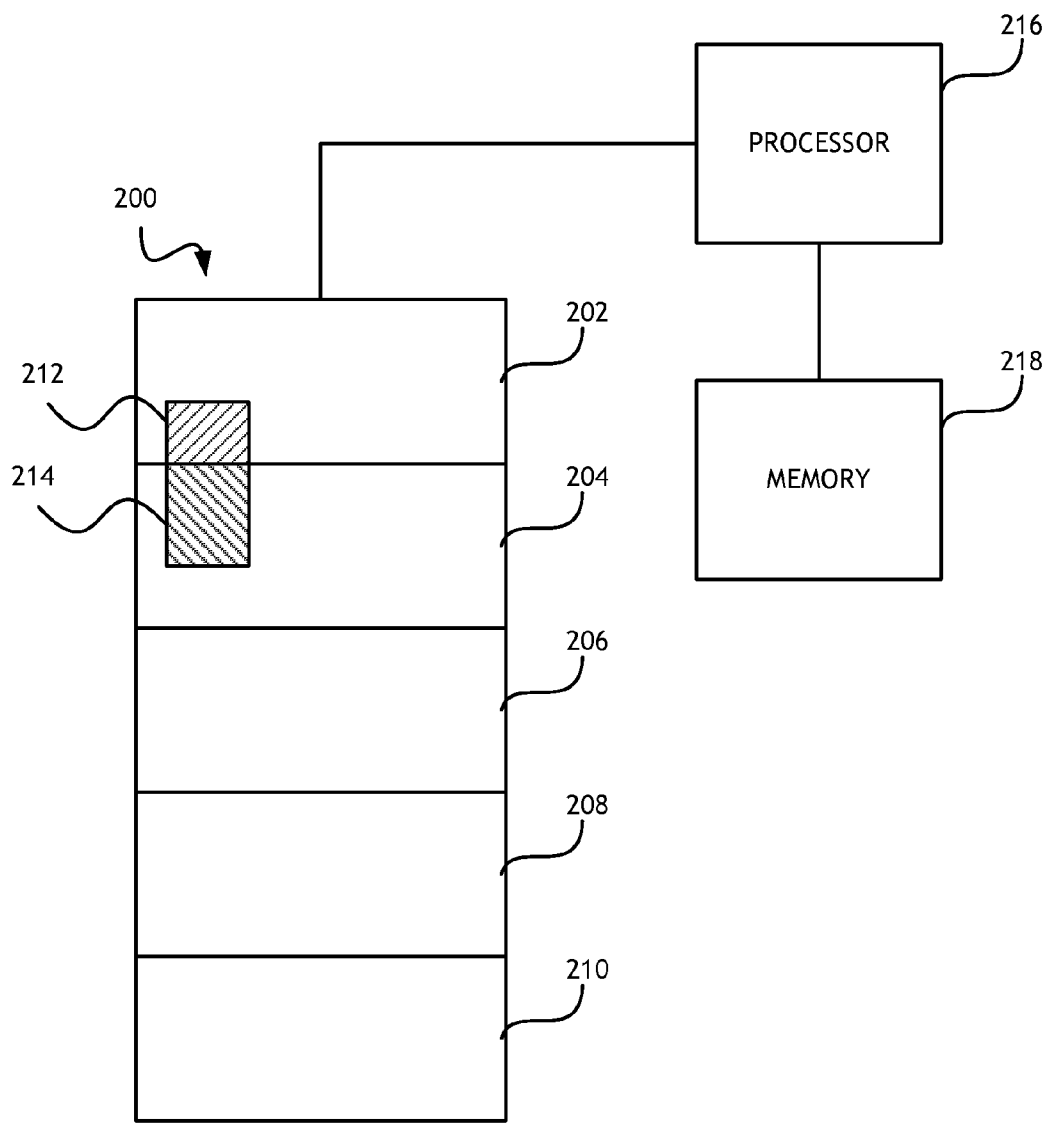
FIG. 2 shows a block diagram of a data storage system with a misaligned block of data.

Referring to FIG. 2, a data storage system may include a processor 216 implementing a file system 104 as described herein, memory 218 and a data storage device 200. The data storage device 200 may be divided into uniformly sized data blocks 202-210. Uniformly sized data blocks 202-210 may be addressable, logical divisions in a physical data storage medium such as a hard disk drive. Where a data storage device 200 is divided into uniformly sized data blocks 202-210, the processor 216 may begin any write operation at the beginning to a uniformly sized data block 202-210. Where a block of data 212, 214 (regarded as a single block of data) would occupy a single uniformly sized data block 202-210, except that the block of data 112 and 214 is misaligned, any write operation attempting to overwrite the block of data 212, 214 would actually perform two write operations. The first write operation would begin at the uniformly sized data block 202 containing the first portion of the block of data 212; then the second write operation would begin at the uniformly sized data block 204 containing the second portion of the block of data 214. One skilled in the art will appreciate that the term "misaligned" refers only to the start and end location of the block of data as indicated by a starting VBN of the block to be overwritten relative to the start and end location of uniformly sized data blocks in a data storage device; "misaligned" does not imply an error or failure state.

Where a data storage device 200 employs some compression algorithm to increase the effective storage capacity of the data storage device 200, every write operation may incur overhead associated with reading old data, for example the first portion of the block of data 212, uncompressing the old data, modifying the old data, and re-compressing the newly modified data. Where data is misaligned, the overhead associated with the write operation effectively doubles because portion of the data block 212, 214 must be processed separately.

Figure 3:
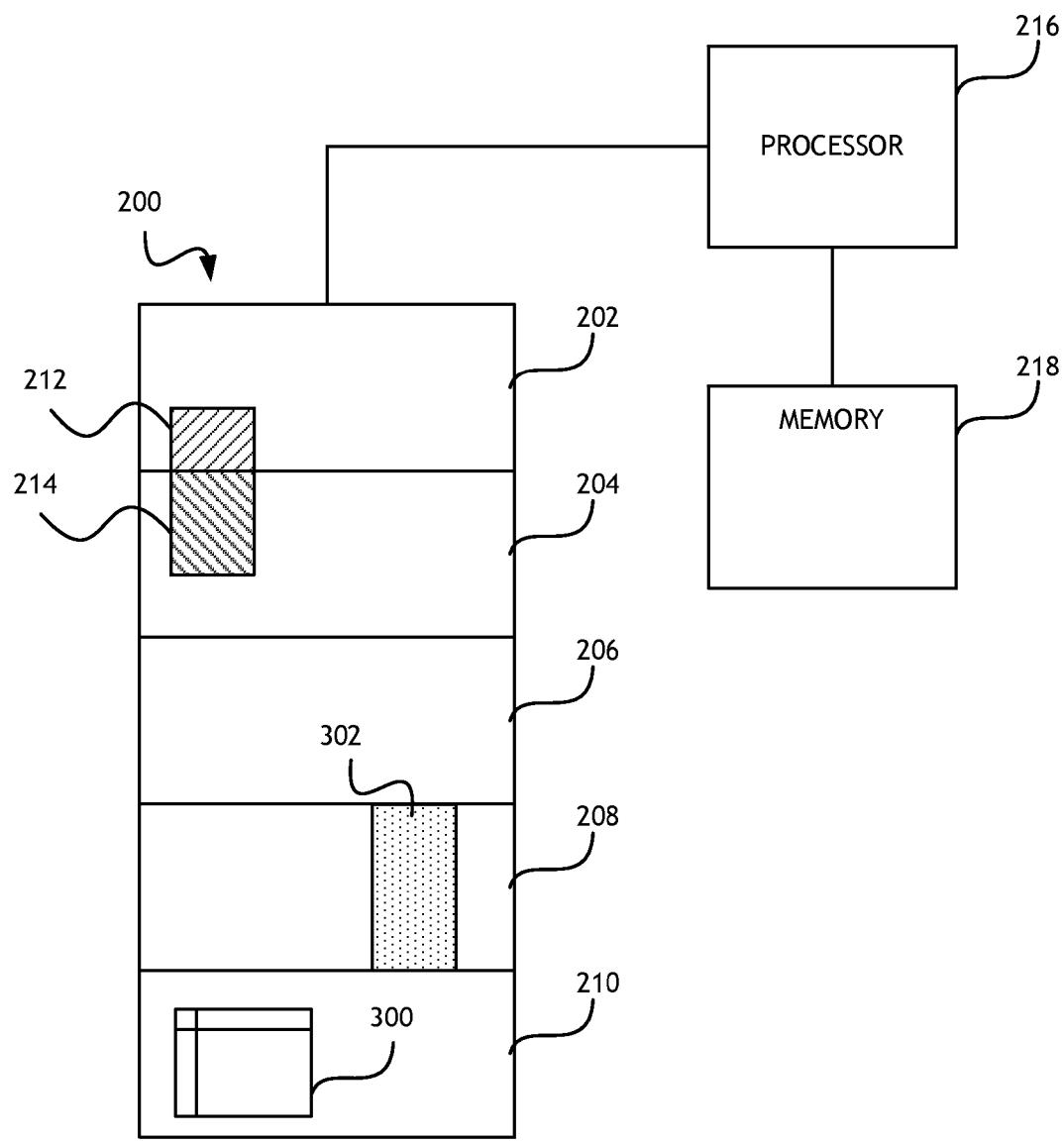
FIG. 3 shows a block diagram of a data storage system having an extent table and new data written to a new block of data instead of overwriting the misaligned block of data.

Referring to FIG. 3, a data storage system according to one embodiment of the present invention may include a processor 216 configured to handle write operations where said write operations overwrite misaligned blocks of data; memory 218 connected to the processor 216 and a data storage device 200 connected to the processor 216. The data storage device 200 may be divided into uniformly sized data blocks 202-210. The data storage system may further include an extent table 300; said extent table 300 may be stored in one of the uniformly sized data blocks 202-210 in the data storage device 200. One skilled in the art will appreciate that the extent table 300, as further described herein, may be necessary to maintain fault tolerance in a fault tolerant data storage system; therefore, the extent table 300 should be stored in a persistent data storage device such as a hard disk drive, solid state drive or other such persistent data storage device. The extent table 300 may also be replicated in a cache. When the processor 216 receives a write operation attempting to overwrite a misaligned block of data 212, 214, the processor 216 may allocate a new block of data 302 and write the new data to the new block of data 302. The processor 216 may determine that a misaligned block of data 212, 214 is misaligned by comparing a memory address of the beginning of the first portion of the misaligned block of data 212 with a memory address of a first uniformly sized data block 202 containing the first portion of the misaligned block of data 212; where a disparity between the two memory addresses exists, a block of data may be misaligned. The new block of data may be aligned such that the write operation begins at a memory address corresponding to the beginning of a data block 202-210. Beginning the write operation at the beginning of a data block may reduce the total overhead where the data being overwritten is not otherwise aligned with the beginning of a data block 202-210 because write operations overwriting a misaligned block of data are treated as two separate write operations, each requiring read, modify and write procedures.

Furthermore, where a data storage system employs a compression algorithm, new data written to a new block of data 302 may be written uncompressed. Writing new data uncompressed further reduces overhead. In a data storage system according to the present invention, where the data storage system employs a compression algorithm, newly written uncompressed data may be periodically compressed when system resources are available such as during off-peak processing times or other pre-determined times during which administrative storage system operations may be performed.

The processor 216 may also allocate one or more records in the extent table 300. The one or more records in the extent table 300 may associate the new block of data 302 with the misaligned block of data 212, 214 so that the processor 216 may direct operations attempting to access the misaligned block of data 212, 214 to the new block of data 302. At least one of the one more records in the extent table 300 may record a logical block address for a first block 202 containing the first portion of the block of data 212, and may further record a starting location of the first portion of the block of data 212 within the first block. Said starting location may comprise an offset value that corresponds to a number of bytes between the beginning of the first block 202 and the beginning of the first portion of the misaligned block of data 212, or the offset value may correspond to a difference in memory address values between the beginning of the first block 202 and the beginning of the first portion of the misaligned block of data 212. The offset value allows the processor 216 to identify precisely what data in the first block 202 corresponds to the beginning of the new block of data 302 so that operations attempting to access data in the misaligned block of data 212, 214 may be properly redirected.

At least one of the one or more records in the extent table 300 may record an old block length value corresponding to the amount of data in the first portion of the block of data stored in the first block 202, and may also record a new block length corresponding to the amount of data in the new block of data 302 that records equivalent data to the old block length value. Those skilled in the art will appreciate that the new block length value may be equal to the old block length value in a data storage system that does not utilize a compression algorithm, or the new block length value may be different from the old block length value where the misaligned block of data 212, 214 is compressed but the new block of data 302 is not. The extent table 300 thereby fully maps the data in the first portion of the misaligned block of data 212 to a portion of data in the new block of data 302.

Furthermore, at least one of the one more records in the extent table 300 may record a logical block address for a second block 204 containing the second portion of the misaligned block of data 214, and may further record a starting location of the second portion of the misaligned block of data 214 within the second block 204. Said starting location may comprise an offset value that corresponds to a number of bytes between the beginning of the second block 204 and the beginning of the second portion of the misaligned block of data 214, or the offset value may correspond to a difference in memory address values between the beginning of the second block 204 and the beginning of the second portion of the misaligned block of data 214. The starting location of the second portion of the misaligned block of data 214 may correspond to the starting location of the second block 204, in which case the offset value may be zero. Likewise, at least one of the one or more records in the extent table 300 may record a starting location in the new block of data 302 of data that would have overwritten the second portion of the misaligned block of data 214 if the data had not been written to the new block of data 302 according to the present invention. Said starting location may comprise an offset value that corresponds to a number of bytes between the beginning of the new block of data 302 and the starting location of the data in the new block of data 302 that would have overwritten the second portion of the misaligned block of data 214, or the offset value may correspond to a difference in memory address values between the beginning of the new block of data 302 and the beginning of the starting location of the data in the new block of data 302 that would have overwritten the second portion of the misaligned block of data 214. The offset value allows the processor 216 to identify precisely what data in the new block of data 302 corresponds to the beginning of the second data block 204 so that operations attempting to access data in the misaligned block of data 212, 214 may be properly redirected.

At least one of the one or more records in the extent table 300 may record an old block length value corresponding to the amount of data in the second portion of the misaligned block of data 214 stored in the second data block 204, and may also record a new block length corresponding to the amount of data in the new block of data 302 that records equivalent data to the old block length value. Those skilled in the art will appreciate that the new block length value may be equal to the old block length value in a data storage system that does not utilize a compression algorithm, or the new block length value may be different from the old block length value where the misaligned block of data 212, 214 is compressed but the new block of data 302 is not.

In the data storage system of FIG. 3, the processor 216 may examine the extent table 300 during read or write operations to determine if the read or write operation involves a block of data that has been remapped to a new block of data 302. In such case the processor 216 may execute the read or write operation on the new block of data 302. Alternatively, the processor 216 may allocate additional new blocks of data and extent table 300 entries in response to write operations directed toward the misaligned block of data 212, 214 or the new block of data 302.

In a data storage system according to the present invention, a misaligned block of data 212, 214 may be modified by more than one write operation over time. Each write operation may cause the processor 216 to allocate an additional new block of data, distinct from any new blocks of data allocated in response to previous write operations, and new extent table 300 entries, also distinct from any extent table 300 entries entered in response to previous write operations. Multiple write operations directed to the same misaligned block of data 212, 214 may therefore produce multiple data blocks of modified data and multiple extent table 300 entries mapping various portions of various data blocks onto other data blocks. Where a one or more extent table 300 entries map a new block of data 302 onto a misaligned block of data 212, 214, one or more different extent table 300 entries may map a different blocks of data onto the new block of data 302. Where one or more different extent table 300 entries maps a different blocks of data onto the new block of data 302, the data storage system may lazily coalesce the extent table 300, or consolidate extent table 300 entries when system resources are not otherwise utilized, to compact blocks of data for improved space efficiency and performance. A processor 216 may traverse entries in the extent table 300 to find the most recently written block of data and therefore the most current data. For example, where a data storage system according to the present invention receives multiple write operations directed to the same misaligned block of data 212, 214, the processor 216 may allocate additional new blocks of data and extent table 300 entries, each extent table 300 entry may map a new block of data onto the misaligned block of data 212, 214, and each extent table 300 entry may include a time stamp. The processor 216 may traverse entries in the extent table 300 by examining each extent table 300 entry including a reference to the misaligned block of data 212, 214 to find the extent table 300 entry with the latest time stamp. Alternatively, a first extent table 300 entry may map a first new block of data onto the misaligned block of data 212, 214, and a second extent table 300 entry may map a second new block of data onto the first new block of data. The processor 216 may traverse entries in the extent table 300 by searching for an extent table 300 entry mapping the misaligned block of data 212, 214 to the first new block of data, then searching for an extent table 300 entry mapping the first new block of data to the second new block of data, and so forth until the processor 216 fails to find an extent table 300 entry mapping a block of data to some other block of data. When the processor 216 fails to find an extent table 300 entry mapping a block of data to some other block of data, the processor has found the most recently written data.

In a data storage system according to the present invention where a misaligned block of data is subject to more than write operation, the processor 216 may periodically consolidate extent table 300 entries. Extent table 300 entries are consolidated by identifying all extent table 300 entries mapping a misaligned block of data to a new block of data, and removing all but the most recent of those extent table 300 entries. Alternatively, extent table 300 entries may be consolidated by re-mapping a misaligned block of data 212, 214 to the most recent new block of data in a chain of extent table 300 entries beginning with the misaligned block of data 212, 214. Where 300a chain of extent table 300 entries represents a sequence of write operations concerning the same block of data, the processor 216 may traverse entries in the extent table 300 by searching for a first extent table 300 entry mapping the misaligned block of data 212, 214 to a first new block of data, then searching for a second extent table 300 entry mapping the first new block of data to a second new block of data, and so forth until the processor 216 fails to find an extent table 300 entry mapping a block of data to some other block of data. When the processor 216 fails to find an extent table 300 entry mapping a block of data to some other block of data, the processor has found the most recently written data. The processor 216 may then re-map the misaligned block of data 212, 214 to the most recently written data by modifying the first extent table 300 entry to map the misaligned block of data 212, 214 to the most recently written data and then removing the second extent table 300 entry.30021213002121

The processor 216 may, at some time when system resources are available, copy and compress data from the new block of data 302 to the misaligned block of data 212, 214 and remove any corresponding records from the extent table 300. Alternatively, the processor 216 may compress the new block of data 302 and modify an entry in a file allocation table or some other data storage referencing mechanism (not shown), to remove any reference to the misaligned block of data 212, 214, and replace it with a reference to the new block of data 302. A data storage system according to this embodiment may reduce the number of write operations during times when system resources are scarce.

Figure 4:
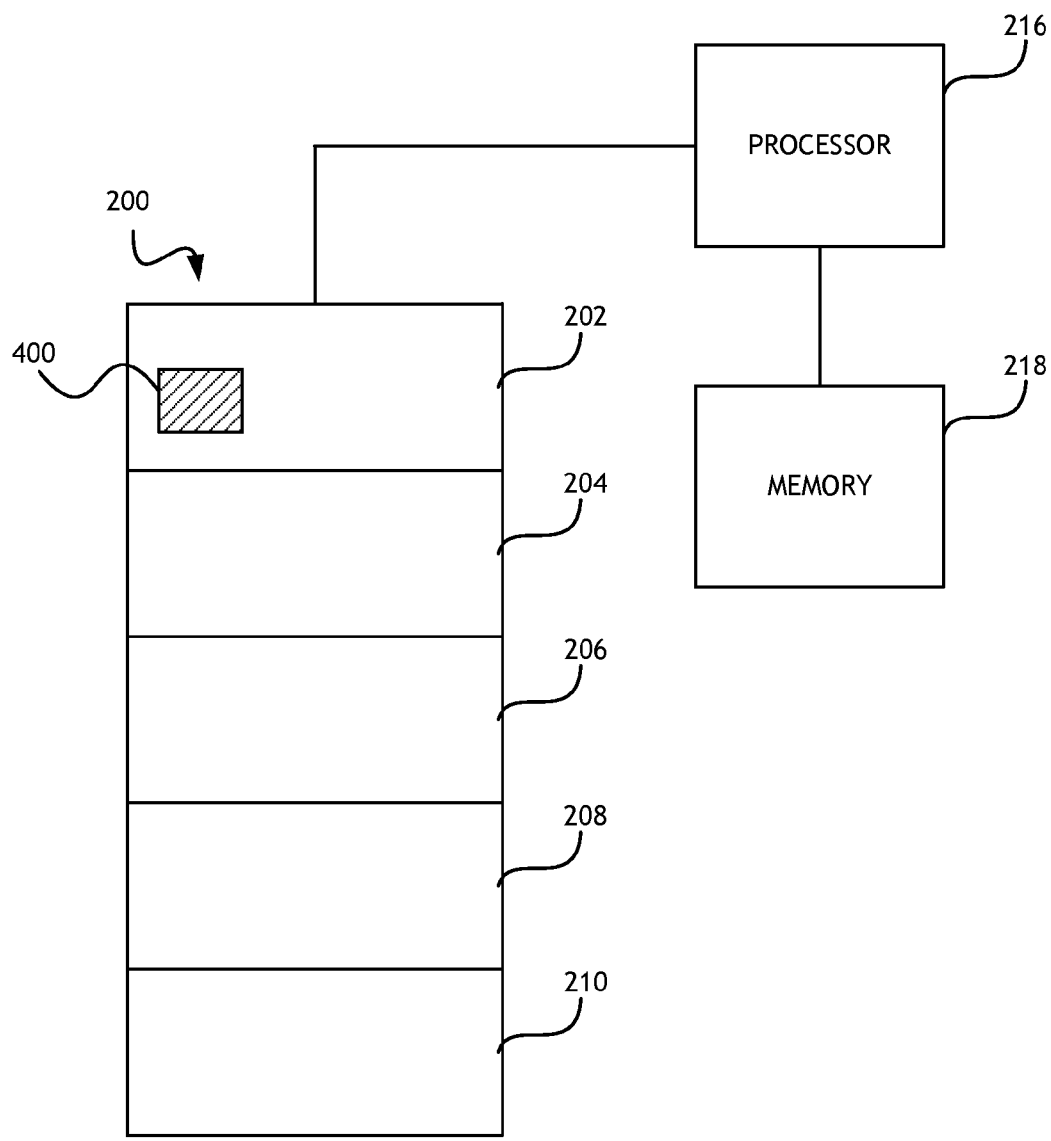
FIG. 4 shows a block diagram of a data storage system with a partial block of data.

Referring to FIG. 4, a data storage system, similar to the data storage system shown in FIG. 2, may include a processor 216, memory 218 and a data storage device 200. A partial block of data 400 may occupy some portion of a uniformly sized data block 202. Where the partial block of data 400 does not begin at the start of a uniformly sized data block 202-210, any write operation would have to begin at the start of the uniformly sized data block 202 containing the partial block of data 400. Traversing a uniformly sized block of data 202-210 from the beginning to overwrite only a partial block data 400 contained therein wastes system resources.

Figure 5:
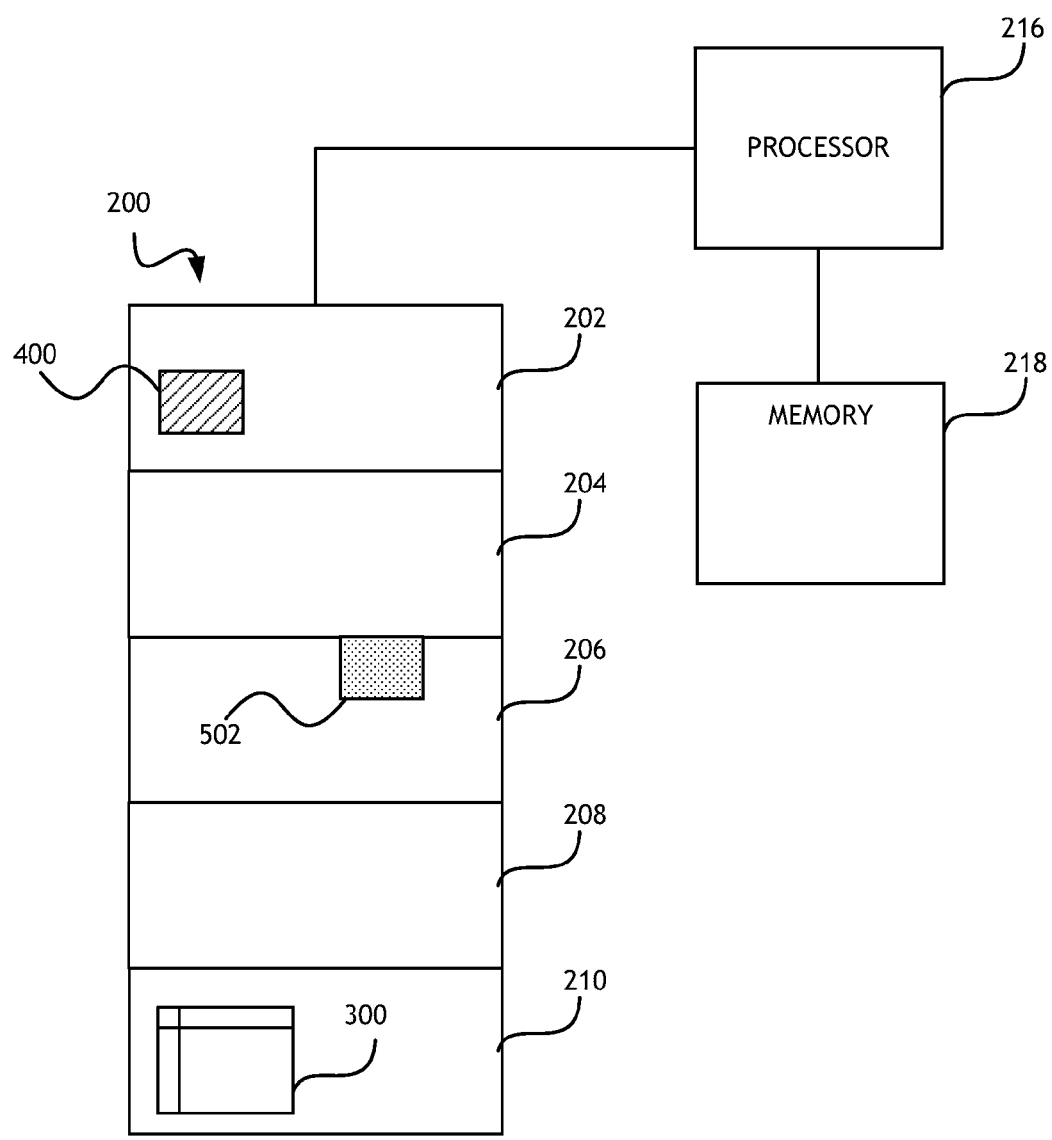
FIG. 5 shows a block diagram of a data storage system having an extent table and new data written to a new block of data instead of overwriting the partial block of data.

Referring to FIG. 5, a data storage system according to another embodiment of the present invention may include a processor 216 configured to handle write operations where said write operations overwrite partial blocks of data; memory 218 connected to the processor 216 and a data storage device 200 connected to the processor 216. The data storage device 200 may be divided into uniformly sized data blocks 202-210. The data storage system may further include an extent table 300; said extent table may be stored in one of the uniformly sized data blocks 202-210 in the data storage device 200. When the processor 216 receives a write operation attempting to overwrite a partial block of data 400, the processor 216 may allocate a new block of data 502 and write the new data to the new block of data 502. The new block of data 502 may be aligned such that the write operation begins at a memory address corresponding to the beginning of a data block 202-210. Beginning the write operation at the beginning of a data block 202-210 may reduce the total overhead where the data being overwritten is not otherwise aligned with the beginning of a data block 202-210 because write operations overwriting a partial block of data 400 must necessarily begin at the beginning of a data block and traverse the data block until reaching the partial block of data 400.

Furthermore, where a data storage system employs a compression algorithm, new data written to a new block of data 502 may be written uncompressed. Writing new data uncompressed further reduces overhead. In a data storage system according to the present invention, where the data storage system employs a compression algorithm, newly written uncompressed data may be periodically compressed when system resources are available.

The processor 216 may also allocate one or more records in the extent table 300. The one or more records in the extent table 300 may associate the new block of data 502 with the partial block of data 400 so that the processor 216 may direct operations attempting to access the partial block of data 400 to the new block of data 502. At least one of the one more records in the extent table 300 may record a logical block address for a first block 202 containing the partial block of data 400, and may further record a starting location of the misaligned block of data 400 within the first block 202. Said starting location may comprise an offset value that corresponds to a number of bytes between the beginning of the first block 202 and the beginning of the partial block of data 400, or the offset value may correspond to a difference in memory address values between the beginning of the first block 202 and the beginning of the partial block of data 400. The offset value allows the processor 216 to identify precisely what data in the first block 202 corresponds to the beginning of the new block of data 502 so that operations attempting to access data in the partial block of data 400 may be properly redirected.

At least one of the one or more records in the extent table 300 may record an old block length value corresponding to the amount of data in the partial block of data 400 stored in the first block 202, and may also record a new block length corresponding to the amount of data in the new block of data 502 that records equivalent data to the old block length value. Those skilled in the art will appreciate that the new block length value may be equal to the old block length value in a data storage system that does not utilize a compression algorithm, or the new block length value may be different from the old block length value where the partial block of data 400 is compressed but the new block of data 502 is not. The extent table 300 thereby fully maps the data in the partial block of data 400 to the new block of data 502.

In the data storage system of FIG. 5, the processor 216 may examine the extent table 300 during read or write operations to determine if the read or write request involves a block of data that has been remapped to a new block of data 502. In such case the processor 216 may execute the read or write operation on the new block of data 502. Alternatively, the processor 216 may allocate additional new blocks of data and extent table 300 entries in response to write operations directed toward the partial block of data 400 or the new block of data 502.

In a data storage system according to the present invention, a partial block of data 400 may be modified by more than one write operation over time. Each write operation may cause the processor 216 to allocate an additional new block of data, distinct from any new blocks of data allocated in response to previous write operations, and new extent table 300 entries, also distinct from any extent table 300 entries entered in response to previous write operations. Multiple write operations directed to the same partial block of data 400 may therefore produce multiple data blocks of modified data and multiple extent table 300 entries mapping various portions of various data blocks onto other data blocks. Where one or more extent table 300 entries map a new block of data 502 onto a partial block of data 400, one or more different extent table 300 entries may map a different data block onto the new block of data 502. Where one or more different extent table 300 entries maps a different blocks of data onto the new block of data 302, the data storage system may lazily coalesce the extent table 300 to compact blocks of data for improved space efficiency and performance. Coalescing may include combining two or more partial blocks of data into a single block of data. A processor 216 may traverse entries in the extent table 300 to find the most recently written data block and therefore the most current data.

In a data storage system according to the present invention where a partial block of data is subject to more than one write operation, the processor 216 may periodically consolidate extent table 300 entries. Where more than one extent table 300 entry maps the same block of data, or where a chain of extent table 300 entries represents a sequence of write operations concerning the same block of data, the processor 216 may re-map the most recent extent table 300 entry to directly map the partial block of data 400 to the most recent newly written data block, and remove all other extent table 300 entries concerning the partial block of data 400.

The processor 216 may, at some time when system resources are available, copy and compress data from the new block of data 502 to the partial block of data 400 and remove any corresponding records from the extent table 300. Alternatively, the processor 216 may compress the new block of data 502 and modify an entry in a file allocation table or some other data storage referencing mechanism (not shown), to remove any reference to the partial block of data 400, and replace it with a reference to the new block of data 502. A data storage system according to this embodiment may reduce the number of write operations during times when system resources are scarce.

Figure 6:
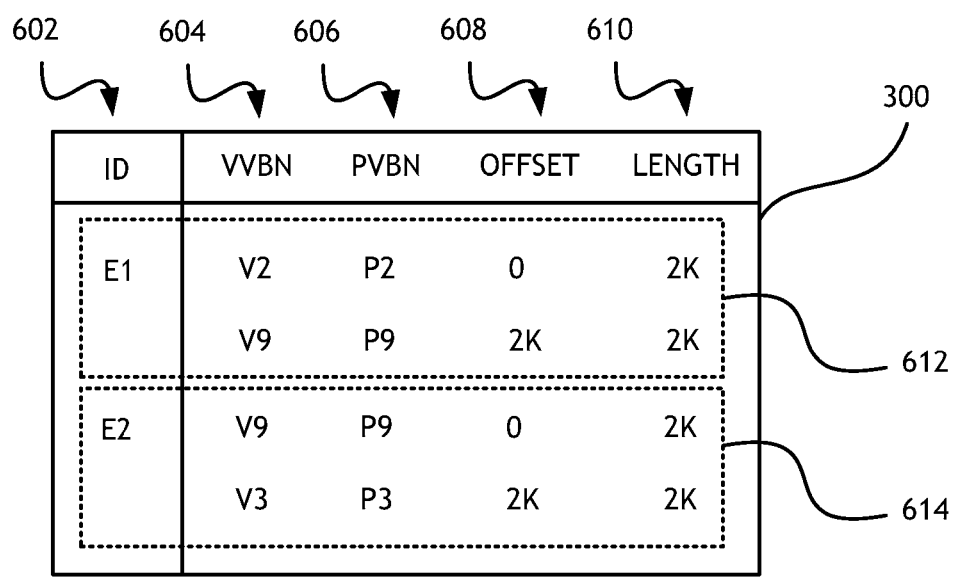
FIG. 6 shows a block diagram of an extent table associating a new block of data with two partial data blocks.

Referring to FIG. 6, an extent table 300 such as shown in FIG. 3 and FIG. 5 may contain one or more records 612, 614 associating overwritten blocks of data with new blocks of data in a data storage having uniformly sized data blocks 202-210 of 4K each. Each record 612, 614 in the extent table 300 may include a record ID 602, a VVBN 604, a PVBN 606, an offset value 608 and a length value 610. In an embodiment such as shown in FIG. 3, a first record 612 may include a virtual address V9 and a physical address P9 of the new block of data 302. The first record 612 may also include a virtual address V2 and physical address P2 of the first portion of the misaligned block of data 212. The first record 612 may also include an offset value 608 associated with V2, P2, representing the length by which the beginning of the first portion of the misaligned block of data 212 is offset from the beginning of the new block of data 302, and a length value 610 associated with V2, P2 representing the total length of the first portion of the misaligned block of data 212 found at V2, P2. The first record 612 may include a length value 610 associated with V9, P9 representing the total length of the newly written data corresponding to the first portion of the misaligned block of data 212. The first record 612 maps the first portion of the misaligned block of data 212 to a portion of the new block of data 302; a processor 216 may use the first record 612 to redirect operations attempting to access the first portion of the misaligned block of data 212 to the corresponding portion of the new block of data 302.

A second record 614 may include a virtual address V9 and a physical address P9 of the new block of data 302. The second record 614 may also include a virtual address V3 and physical address P3 of the second portion of the misaligned block of data 214. The second record 614 may also include an offset value 608 associated with V3, P3, representing the length by which the beginning of the second portion of the misaligned block of data 214 is offset from the beginning of the new block of data 302, and a length value 610 associated with V3, P3 representing the total length of the second portion of the misaligned block of data 214 found at V3, P3. The second record 614 may include a length value 610 associated with V9, P9 representing the total length of the newly written data corresponding to the second portion of the misaligned block of data 214. The second record 614 maps the second portion of the misaligned block of data 214 to a portion of the new block of data 302; a processor 216 may use the second record 614 to redirect operations attempting to access the second portion of the misaligned block of data 214 to the corresponding portion of the new block of data 302.

An extent table 300 may include one record for each partial block of data. In an embodiment where partial blocks of data 400 exist entirely within a uniformly sized data block 202 such as shown in FIG. 5, a first record 612 may include a virtual address V9 and a physical address P9 of the new block of data 302. The first record 612 may also include a virtual address V2 and physical address P2 of the partial block of data 400. The first record 612 may also include an offset value 608 associated with V2, P2, representing the length by which the beginning of the partial block of data 400 is offset from the beginning of the new block of data 302, and a length value 610 associated with V2, P2 representing the total length of the partial block of data 400 found at V2, P2. The first record 612 may include a length value 610 associated with V9, P9 representing the total length of the newly written data corresponding to the partial block of data 400. The first record 612 maps the partial block of data 400 to a portion of the new block of data 302; a processor 216 may use the first record 612 to redirect operations attempting to access the partial block of data 400 to the corresponding portion of the new block of data 302. Length values 610 and offset values 608 in FIG. 6 are shown in kilobytes; one skilled in the art will appreciated that value representations other than kilobytes may be used.

Figure 7:
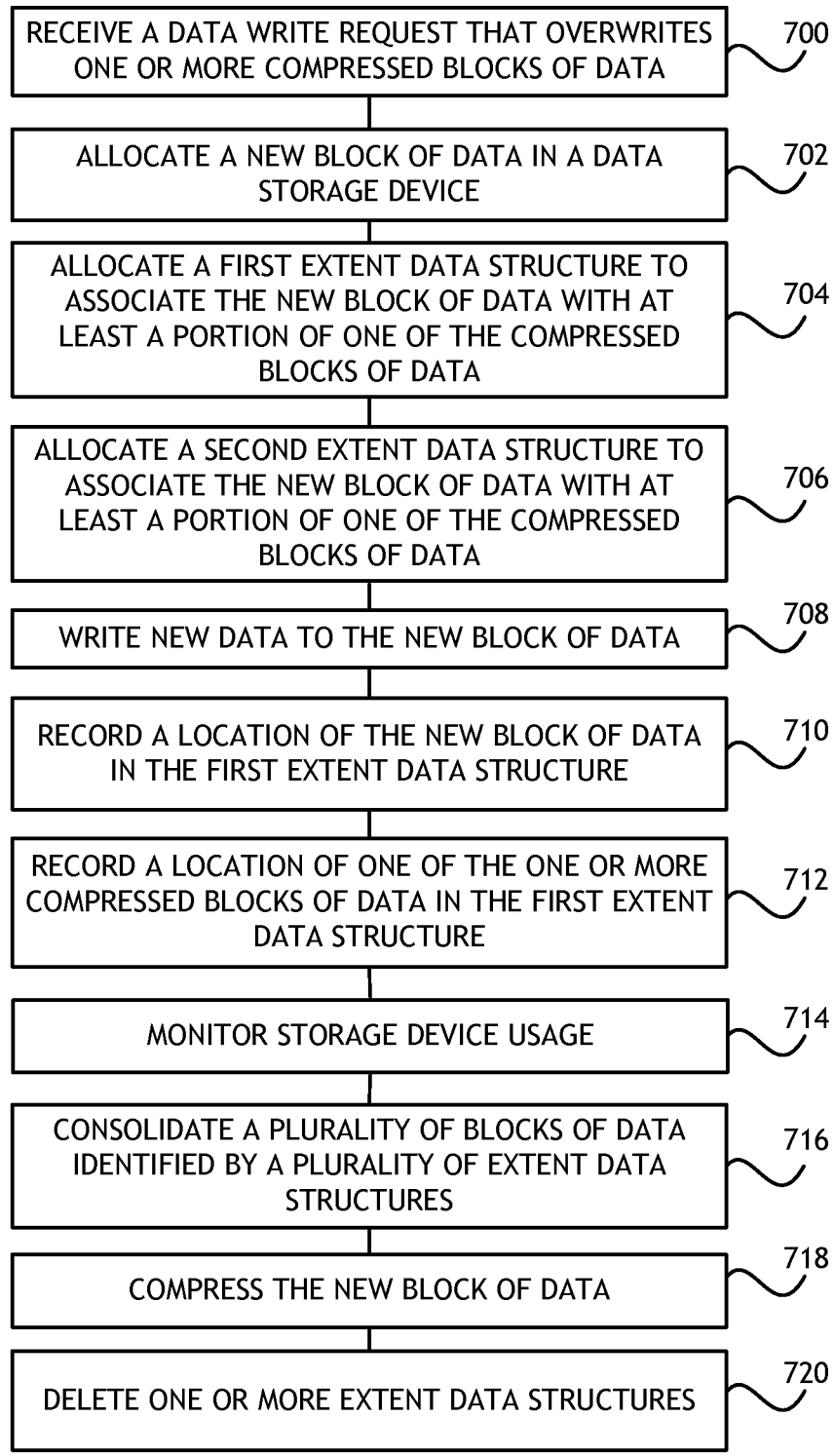
FIG. 7 shows a flowchart of a method for writing data in a system having partial blocks of data.

Referring to FIG. 7, a method for executing write operations in a data storage system is shown. A processor may receive 700 write requests that overwrite one or more compressed blocks of data. Where the compressed blocks of data occupy only a portion of one or more data blocks based on the based on the size of the compressed blocks of data compared to the known size of each data block, the processor may allocate 702 a new block of data in a data storage device, where the new block of data begins at the beginning of a separate data block. The processor 216 may determine that the compressed blocks of data occupy only a portion of a uniformly sized data block by comparing a memory address of the beginning of the compressed block of data and a memory address of the end of the compressed block of data with a memory address of the beginning of the uniformly sized data block containing the compressed block of data and the end of the uniformly sized data block containing the compressed block of data respectively; where a disparity between the beginning and/or ending memory addresses exists, a compressed blocks of data may occupy only a portion of a uniformly sized data block. The processor may then write 708 the new data to the newly allocated block of data. The processor may also allocate 704 a first extent data structure, such as a record in an extent table, to associate one of the one or more the compressed blocks of data with the newly allocated block of data so that subsequent operations attempting to access that compressed block of data may be redirected to the new block of data. The processor may then record 710, in the first extent data structure, a location of one of the one or more compressed blocks of data and a location of the newly allocated block of data. The location of the compressed block of data and the location of the newly allocated block of data may comprise a VVBN and/or a PVBN.

Where a write operation has attempted to overwrite a contiguous, compressed block of data partially spanning two uniformly sized data blocks, the processor may allocate 706 a second extent data structure to associate the portion of the compressed block of data contained in a second uniformly sized data block with the newly allocated block of data so that subsequent operations attempting to access that portion may be redirected to the new block of data. The processor may then record 712, in the second extent data structure, a location of the portion of the compressed block of data contained in a second uniformly sized data block and a location in the newly allocated block of data. The location of the portion of the compressed block of data contained in a second uniformly sized data block and the location of the newly allocated block of data may comprise a VVBN and/or a PVBN. The second extent data structure may also include an offset value representing a distance within the newly allocated block of data where the beginning of the portion of the compressed block of data contained in a second uniformly sized data block may be found.

In a data storage system according to the present invention where compressed blocks of data are subject to more than one write operation, each write operation may consume additional storage space capacity. To reclaim storage capacity, the processor may periodically consolidate extent data structures. Extent table 300 entries are consolidated by identifying all extent table 300 entries mapping a compressed block of data to a new block of data, and removing all but the most recent of those extent table 300 entries. Alternatively, extent table 300 entries may be consolidated by re-mapping a compressed block of data to the most recent new block of data in a chain of extent table 300 entries beginning with the compressed block of data. Where a chain of extent table 300 entries represents a sequence of write operations concerning the same block of data, the processor 216 may traverse entries in the extent table 300 by searching for a first extent table 300 entry mapping the compressed block of data to a first new block of data, then searching for a second extent table 300 entry mapping the first new block of data to a second new block of data, and so forth until the processor 216 fails to find an extent table 300 entry mapping a block of data to some other block of data. When the processor 216 fails to find an extent table 300 entry mapping a block of data to some other block of data, the processor has found the most recently written data. The processor 216 may then re-map the compressed block of data to the most recently written data by modifying the first extent table 300 entry to map the compressed block of data to the most recently written data and then removing the second extent table 300 entry.

The processor may monitor 714 storage device usage or storage device capacity to determine an appropriate time to consolidate a plurality of blocks of data. One example of an appropriate time to consolidate a plurality of blocks of data may be when system resource usage is below a certain threshold, or when available storage capacity is below a certain threshold. When appropriate, the processor may consolidate 716 and compress 718 data from one or more newly allocated blocks of data and remove 720 any corresponding extent data structures. The processor may also modify an entry in a file allocation table or some other data storage referencing mechanism (not shown), to remove any reference to the one or more old compressed blocks of data, and replace it with a reference to the new block of data. This method of data storage may reduce the number of write operations during times when system resources are scarce.

It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method of processing data write requests in a data storage system, comprising:
   identifying a misaligned compressed data block that occupies only a portion of a first uniformly sized data block of a storage device by determining disparity between a memory address of the misaligned compressed data block with a memory address of the uniformly sized first data block where the compressed data block is stored;
   receiving a data write request, said data write request configured to replace old data, stored at the compressed data block, with new uncompressed data;
   allocating a new uniformly sized data block at the storage device;
   allocating a first extent data structure configured to associate a location of the new uncompressed data with a location of the old data;
   writing the new uncompressed data to the new uniformly sized block of data;
   recording a location of the new uncompressed data to the first extent data structure;
   recording a first location of the old data to the first extent data structure; and
   compressing the new uncompressed data based on storage device usage or storage device capacity.

2. The method of claim 1, further comprising:
   allocating a second extent data structure to associate a portion of the misaligned compressed data block that spans the first uniformly sized data block and a second uniformly sized data block; and
   recording a second location of the old data to the second extent data structure, where the second location corresponds to the second uniformly sized data block storing the portion of the misaligned compressed data block and another uniformly sized data block allocated for storing the portion stored at the second uniformly sized data block.

3. The method of claim 1, further comprising:
   identifying a most recently used extent data structure for the misaligned compressed data block, when the misaligned compressed data block is subject to more than one write operation; and
   deleting other extent data structures, except the most recently used extent data structure for the misaligned compressed data block.

4. The method of claim 1, further comprising monitoring storage device usage.

5. The method of claim 4, further comprising:
   consolidating a plurality of extent data structures when storage device usage is below a threshold; and
   deleting one or more of the plurality of extent data structures.

6. The method of claim 1, further comprising:
   monitoring remaining storage device capacity.

7. The method of claim 6, further comprising:
   consolidating a plurality of extent data structures when storage device capacity is below a threshold; and
   deleting one or more of the plurality of extent data structures.

8. A non-transitory, machine readable storage medium having stored thereon instructions for performing a method of processing data write requests in a data storage system, comprising machine executable code which when executed by at least one machine, causes the machine to:
   identify a misaligned compressed data block that occupies only a portion of a first uniformly sized data block of a storage device by determining any disparity between a memory address of the misaligned compressed data block with a memory address of the uniformly sized first data block where the compressed data block is stored;
   receive a data write request, said data write request configured to replace old data, stored at the compressed data block with new uncompressed data;
   allocate a new uniformly sized data block at the storage device;
   allocate a first extent data structure configured to associate a location of the new uncompressed data with a location of the old data;
   write the new uncompressed data to the new uniformly sized block of data;
   record a location of the new uncompressed data to the first extent data structure;
   record a first location of the old data to the first extent data structure; and
   compress the new uncompressed data based on storage device usage or storage device capacity.

9. The storage medium of claim 8, the machine executable code further causes the machine to allocate a second extent data structure to associate a portion of the misaligned compressed data block that spans the first uniformly sized data block and a second uniformly sized data block; and record a second location of the old data to the second extent data structure, where the second location corresponds to the second uniformly sized data block storing the portion of the misaligned compressed data block and another uniformly sized data block allocated for storing the portion stored at the second uniformly sized data block.

10. The storage medium of claim 8, the machine executable code further causes the machine to identify a most recently used extent data structure for the misaligned compressed data block, when the misaligned compressed data block is subject to more than one write operation; and delete other extent data structures, except the most recently used extent data structure for the misaligned compressed data block.

11. The storage medium of claim 8, the machine executable code further causes the machine to monitor storage device usage.

12. The storage medium of claim 11, the machine executable code further causes the machine to consolidate a plurality of extent data structures when storage device usage is below a threshold; and delete one or more of the plurality of extent data structures.

13. The storage medium of claim 8, further causes the machine to monitor remaining storage device capacity.

14. The storage medium of claim 13, further causes the machine to consolidate a plurality of extent data structures when storage device capacity is below a threshold; and delete one or more of the plurality of extent data structures.

15. A system comprising:
   a memory containing machine readable medium comprising machine executable code having stored thereon instructions; and a processor module coupled to the memory, the processor module configured to execute the machine executable code to:

identify a misaligned compressed data block that occupies only a portion of a first uniformly sized data block of a storage device by determining any disparity between a memory address of the misaligned compressed data block with a memory address of the uniformly sized first data block where the compressed data block is stored;

receive a data write request, said data write request configured to replace old data, stored at the compressed data block with new uncompressed data;

allocate a new uniformly sized data block at the storage device;

allocate a first extent data structure configured to associate a location of the new uncompressed data with a location of the old data;

write the new uncompressed data to the new uniformly sized block of data;

record a location of the new uncompressed data to the first extent data structure;

record a first location of the old data to the first extent data structure; and compress the new uncompressed data based on storage device usage or storage device capacity.

16. The system of claim 15, the machine executable code, which when executed further allocates a second extent data structure to associate a portion of the misaligned compressed data block that spans the first uniformly sized data block and a second uniformly sized data block; and records a second location of the old data to the second extent data structure, where the second location corresponds to the second uniformly sized data block storing the portion of the misaligned compressed data block and another uniformly sized data block allocated for storing the portion stored at the second uniformly sized data block.

17. The system of claim 15, the machine executable code, which when executed further identifies a most recently used extent data structure for the misaligned compressed data block, when the misaligned compressed data block is subject to more than on write operation; and deletes other extent data structures, except the most recently used extent data structure for the misaligned compressed data block.

18. The system of claim 15, the machine executable code, which when executed further monitors storage device usage.

19. The system of claim 18, the machine executable code, which when executed further consolidates a plurality of extent data structures when storage device usage is below a threshold; and deletes one or more of the plurality of extent data structures.

20. The system of claim 15, the machine executable code, which when executed further monitors remaining storage device capacity.

21. The system of claim 20, the machine executable code, which when executed further consolidates a plurality of extent data structures when storage device capacity is below a threshold; and deletes one or more of the plurality of extent data structures.

* * * * *